United States Patent [19]

Gerson et al.

[11] Patent Number: 4,945,570
[45] Date of Patent: Jul. 31, 1990

[54] METHOD FOR TERMINATING A TELEPHONE CALL BY VOICE COMMAND

[75] Inventors: Ira A. Gerson, Hoffman Estates; Brett L. Lindsley, Palatine, both of Ill.

[73] Assignee: Motorola, Inc., Schaumburg, Ill.

[21] Appl. No.: 399,341

[22] Filed: Aug. 25, 1989

Related U.S. Application Data

[63] Continuation of Ser. No. 105,151, Oct. 2, 1987, abandoned.

[51] Int. Cl.[5] .............................................. H04B 1/46
[52] U.S. Cl. ...................................... 381/110; 379/58; 379/61; 379/389
[58] Field of Search ...................... 455/79; 379/58, 61, 379/389; 381/43, 46, 56, 110; 340/825.32

[56] References Cited

U.S. PATENT DOCUMENTS

| | | | |
|---|---|---|---|
| 3,742,143 | 6/1973 | Awipi | 179/1 SA |
| 4,095,239 | 6/1978 | Gerry | 340/825.32 |
| 4,336,421 | 6/1982 | Welch et al. | 179/1 SD |
| 4,348,550 | 9/1982 | Pirz et al. | 179/1 SD |
| 4,378,603 | 3/1983 | Eastmond | 379/389 |
| 4,400,584 | 8/1983 | Vilmur | 455/79 |
| 4,426,733 | 6/1984 | Brenig | 455/79 |
| 4,506,377 | 3/1985 | Kishi et al. | 381/110 |
| 4,506,378 | 3/1985 | Noso et al. | 381/43 |
| 4,513,189 | 4/1985 | Ueda et al. | 381/110 |
| 4,525,793 | 6/1985 | Stackhouse | 364/513.5 |
| 4,528,687 | 7/1985 | Noso et al. | 381/43 |
| 4,593,157 | 6/1986 | Usdan | 179/90 BD |
| 4,593,403 | 6/1986 | Kishi et al. | 381/110 |
| 4,731,811 | 3/1988 | Dubus | 379/58 |
| 4,737,976 | 4/1988 | Borth et al. | 379/58 |

Primary Examiner—Steven L. Stephan
Assistant Examiner—Judson H. Jones
Attorney, Agent, or Firm—Raymond A. Jenski; Rolland R. Hackbart

[57] ABSTRACT

A reliable method for terminating a telephone call is disclosed using a specific sequence of steps performed by the hands-free control system. The invention requires that the call terminating command sequence be recognized as: (1) two separate speech utterances (e.g., TERMINATE and CONVERSATION); (2) in proper sequence (e.g., TERMINATE first, then CONVERSATION); (3) with a maximum pause time interval between the end of the first utterance and the start of the second utterance (e.g., 300 milliseconds); and (4) which meet predefined speech recognition matching criteria. Moreover, the present invention provides the user with a procedure to continue the telephone call in progress should the speech recognizer false, or if the user did not intend to speak the proper command. As a result, present invention enables a user to disconnect a telephone call by voice command with a high degree of reliability, even under high ambient noise conditions.

43 Claims, 3 Drawing Sheets

METHOD FOR TERMINATING A TELEPHONE CALL BY VOICE COMMAND

This is a continuation of application Ser. No. 105,151 filed Oct. 2, 1987, now abandoned.

BACKGROUND OF THE INVENTION

1. Field of the Invention

The present invention generally relates to speech recognition control systems. More particularly, the present invention relates to a hands-free voice command control system especially suited for use in a noisy environment such as encountered in vehicular radiotelephone applications.

2. DESCRIPTION OF THE PRIOR ART

Typically, in both radio and landline telephone systems, the user communicates by means of a handset that includes a speaker at one end, which is placed close to the user's ear, and a microphone at the other end, which is held close to the user's mouth. In operation, one hand of the user is occupied holding the handset in its proper orientation, thereby leaving the user's only free hand to accomplish tasks such as driving a vehicle. In order to provide a greater degree of freedom for the user, speakerphones have commonly been used in landline telephone systems. Recently, vehicular speakerphones have been developed for use in automobiles. For example, U.S. Pat. No. 4,378,603 by Eastmond and U.S. Pat. No. 4,400,584 by Vilmur, both assigned to the same assignee as the present invention, describe vehicular speakerphones with hands-free operation.

Hands-free control systems, which are responsive to human voice, are highly desirable for use in automotive applications. Most mobile radiotelephone transceiver functions (e.g., on/off, transmit/receive, volume, squelch, etc.) or mobile radiotelephone control functions (e.g., pushbutton dialing, speech recognizer training, telephone call answering) may readily be achieved by voice command without requiring any manual operations. Hence, the use of speech recognition with a vehicular speakerphone has the potential for providing a totally hands-free telephone conversation without ever requiring the automobile driver to remove his hands from the steering wheel or take his eyes off the road. This feature has not only extended the hands-free capability, but also has added to the safety and convenience of using mobile radiotelephones in vehicles.

Unfortunately, the application of complete hands-free control to a mobile radiotelephone introduces several significant obstacles. When speech recognition is utilized in a vehicular environment, the high degree of ambient noise inherent in a vehicle presents a considerable problem to reliable voice control. Furthermore, a vehicular speakerphone typically has a microphone that is distant from the user's mouth, such as being mounted overhead on the automobile sun visor. Consequently, the required high microphone sensitivity causes a large increase in the amount of environmental background noise being applied to the speech recognizer, which degrades its recognition reliability.

More significantly, however, is the problem of speech recognition falsing. If the voice command controller erroneously recognizes a "call answering" command, the speech communications device will simply come "off-hook" at a time when it is not desired — which is typically only a minor inconvenience. However, if the controller erroneously detects a "call terminating" command, the controller will put the device "on-hook" and the telephone call will be inadvertently dropped — which is, at the very least, considerably frustrating to the user. Hence, much more significant consequences result from speech recognition falsing on the call terminating command than on other command words.

For these reasons, the prior art techniques for terminating a hands-free telephone conversation have been severely limited. Most systems are not totally hands-free, since phone calls must still be answered and terminated manually. For example, even though cellular mobile radiotelephones may provide a voice command dialing feature, they often require the user to pick up the handset to activate the voice command system. Other vehicular telephone systems require the user to activate a "call terminate" button mounted on the steering wheel. Still other voice-controlled telephone systems disconnect the call upon the recognition of a voice command corresponding to a single isolated word speech recognition template. In a high noise environment, there is a substantial likelihood that a speech recognizer may false and improperly drop the call. Moreover, a call may be disconnected if the mobile user inadvertently mentions the voice command word during his conversation. The chance of falsing is further increased with the desirable feature of speech recognizer robustness to variability in user voice characteristics.

A need, therefore, exists for a reliable method for terminating a telephone call by voice command in a hands-free speech communications device.

SUMMARY OF THE INVENTION

Accordingly, it is a general object of the present invention to provide an improved method and apparatus for terminating a telephone call by voice command.

A more particular object of the present invention is to provide an improved user-interactive voice command control system capable of totally hands-free operation while providing fewer accidental telephone call disconnections.

In accordance with the present invention, a speech communications device is provided which is controlled by a command signal provided by a voice command control system in response to user-spoken command words. The voice command control system includes a speech recognition unit which recognizes a first user-spoken utterance as one corresponding to a first predefine command word and produces a first detect signal in response to such recognition, and recognizes a second user-spoken utterance as one corresponding to a second predefined command word and produces a second detect signal in response. The control system further includes a device controller which provides the command signal only in response to the occurrence of the first detect signal followed by the second detect signal within a predetermined recognition time interval, such that the recognition of the second command word does not provide the command signal if the predefined maximum pause time interval is exceeded.

In the preferred embodiment, the hands-free user-interactive voice command control system is used with a mobile radiotelephone employing a vehicular speakerphone. The control system includes a mechanism for switching the radiotelephone from an off-hook mode, wherein a communications path is established, to on-hook mode, wherein the communications path is terminated, in response to an on-hook signal. The control system also includes a mechanism for recognizing a first user-spoken utterance as one corresponding to a first predefined terminate command word and for producing a first detect signal in response to such recognition, a timer for measuring a time interval between the end of the first user-spoken utterance and the start of a second user-spoken utterance and for providing a timer signal only if the time interval is within a predefined pause time interval, a mechanism for recognizing the second user-spoken utterance as one corresponding to a second predefined terminate command word and for producing a second detect signal in response to such recognition, a decision mechanism for providing a disconnect signal only in response to the timer signal and the sequential occurrence of the first and second detect signals, a speech synthesizer for providing an indication to a user in response to the disconnect signal, a mechanism for recognizing a subsequent user-spoken utterance as one corresponding to a predefined error command word and for producing an error signal in response to such recognition, and a correction mechanism for providing the on-hook signal in response to the disconnect signal only if the error signal does not occur within a predetermined reconnect time interval after the occurrence of the disconnect signal, such that the recognition of the error command word within the predetermined reconnect time interval prevents the recognition of the terminate command words from causing termination of the communications path.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DETAILED DESCRIPTION OF THE PREFERRED EMBODIMENT

Speech recognition is prone to falsing in high noise environments. Therefore, the present invention uses a predetermined two-word command sequence with a timed inter-word pause interval to initiate the call terminating procedure, along with intelligent interaction with the user to provide the ability to continue a call even if the proper command sequence was recognized. Using a speech recognition grammar structure which requires the recognition of two utterances in sequence significantly reduces the possibility of false recognition during a telephone conversation to an acceptable level, even when used with a continuous speech recognizer. If the particular command words chosen have multiple syllables, then the reliability of the system is further enhanced. Moreover, the present invention provides the user with a means to continue the telephone call in progress should the speech recognizer false, or if the user did not intend to speak the proper command. As a result, the present invention enables a user to disconnect a telephone call by voice command with a high degree of reliability, even under high ambient noise conditions.

Generally, the control system waits for the recognition of the user utterances corresponding to particular voice commands In the preferred embodiment, the two words TERMINATE and CONVERSATION were chosen to represent the call termination command. Both words TERMINATE and CONVERSATION must be recognized — in order — with at most a short pause between them. When the words TERMINATE CONVERSATION are recognized, the control system synthesizes the word TERMINATE to indicate that the call is going to be dropped. At this point, the controller mutes the received audio and waits for a predetermined reconnect time interval, e.g., 5 seconds, and then drops the call. If the user speaks the word CALL during the 5 second wait time, the controller synthesizes a "beep" to indicate that the call will not be dropped, and unmutes the received audio. The controller will not then terminate the call. This method of providing user-interactive feedback during the call terminating procedure allows the user to reconnect the call if the speech recognizer falses, or if the user inadvertently utters the proper command word sequence.

Figure 1:
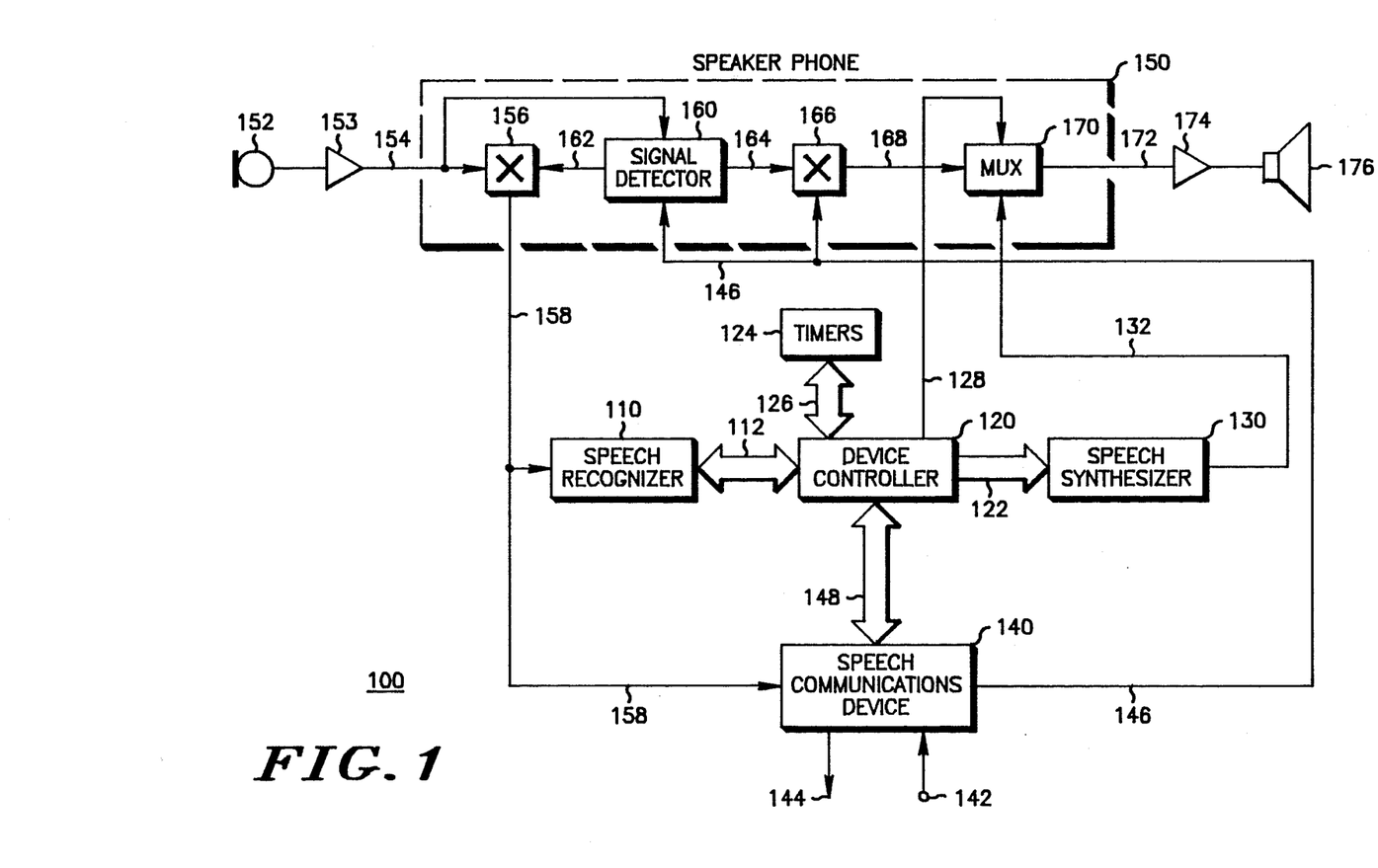
FIG. 1 is a block diagram of a voice command control system for a speech communications device employing a hands-free speakerphone according to the present invention.

Referring now to the accompanying drawings, FIG. 1 shows a general block diagram of user-interactive control system 100 of the present invention. The system is basically comprised of device controller 120 connected to speech communications device 140. The system is particularly adapted to be used with a speakerphone rather than a telephone handset, such that the user's hands are free to perform other tasks. Speakerphone 150 controls the direction of the audio paths to provide this hands-free feature. Speech recognizer 110 is coupled to the speakerphone and the device controller so as to interpret verbal commands from the user into command signals. The device controller monitors the information coming from the speech recognizer as well as from timers 124. The controller has the ability to reset the timers, place the communications device on-hook, select templates and enable speech recognizer 110, and provide information to speech synthesizer 130 to provide feedback to the user.

Speech communications device 140 may include portions of any radio or landline voice communication system, such as, for example, two-way radio systems, telephone systems, intercom systems, etc. In the present embodiment, speech communications device 140 is a radiotelephone transceiver, such as a cellular mobile radiotelephone. A detailed explanation of such a radiotelephone may be found in Motorola Instruction Manual 68P81066E40 entitled, "DYNA T.A.C ® Cellular Mobile Telephone." However, any speech communications device warranting hands-free user-interactive operation may be used. For example, any landline telephone or simplex radio transceiver requiring hand-free control may also take advantage of the present invention.

Speech communications device 140 utilizes transmit path 144 and receive path 142 to interface the transmit/receive audio to the communications channel. In the preferred embodiment of a mobile radiotelephone, these paths may interface to a pair of radio frequency (RF) channels for duplex radiotelephone operation, or perhaps to a single RF channel for simplex operation.

Speech recognizer 110 performs speech recognition upon the input speech signal 158. During recognition, speech recognizer 110 compares previously stored word templates against the input speech information. The recognition algorithm of the present embodiment incorporates near continuous speech recognition, dynamic time warping, energy normalization, and a Chebyshev distance metric to determine a template match. Prior art recognition algorithms, such as described in J. S. Bridle, M. D. Brown and R. M. Chamberlain, "An Algorithm for Connected Word Recognition," *IEEE International Conference on Acoustic Speech and Signal Processing*, (May 3–5, 1982), Vol.2, pp. 899–902, may also be used.

In the present embodiment, an eight-bit microcomputer performs the function of speech recognizer 110. Moreover, several other control systems blocks of FIG. 1 are implemented in part by the same microcomputer with the aid of a CODEC/FILTER and a DSP (digital signal processor). A speech recognizer which may be used to perform the function of block 110 is described in the article by J. Peckham, J. Greene, J. Canning, and P. Stevens, entitled "A Real-Time Hardware Continuous Speech Recognition System," *IEEE International Conference on Acoustics, Speech, and Signal Processing* (May 3–5, 1982), Vol. 2, pp. 863–866, and the references contained therein. However, the present invention is not limited to any specific hardware or any specific type of speech recognition. More particularly, the present invention contemplates the use of speaker dependent or speaker independent speech recognition, isolated or continuous word recognition, and software-based or hardware-based implementation.

Device controller 120 is typically a microprocessor which interfaces between speech communications device 140, speech recognizer 110, and speech synthesizer 130. Device controller 120 translates device control data 112 provided by speech recognizer 110 into control signals that can be recognized by the particular speech communications device. These control signals direct the device to perform specific operating functions as instructed by the user. For example, if a user-spoken utterance corresponds to a predefined call answering or call terminating command, device controller 120 would produce the proper hookswitch control signal via controller bus 148. Controller 120 may also perform voice command control of other features of speech communications device 140, such as: unlocking the control head; dialing a telephone number; or any number of other operational functions.

Device controller 120 also provides device status data 122 representing the operating status of speech communications device 140. This data is applied to speech synthesizer 130, and translated into user-recognizable speech when output via speaker 176. For example, when a user-spoken utterance corresponds to a predefined voice command, speech synthesizer 130 would synthesize an indication to the user in response to such recognition. Status information may also include information as to the names and telephone numbers stored in a voice-dialing system ("Office", "555-1234", etc.), speech recognition status information ("Ready", "Terminate", etc.), or radiotelephone status information ("Call Dropped", "System Busy", etc.).

In the present embodiment, a 19-channel vocoder is used as speech synthesizer 130. An example of such a vocoder may be found in J. N. Holmes, "The JSRU Channel Vocoder", *IEE Proc.*, Vol. 127, pt. F, No. 1, February 1980), pp. 53–60. However, as will be apparent to those skilled in the art, any speech synthesis apparatus may be utilized. Furthermore, the present invention contemplates that any means of providing an indication to the user would perform the basic reply function of the speech synthesizer block 130. For example, a visual indication (e.g., LED, LCD, CRT, etc.) or an audible indication (e.g., tone generator or other audible signal) may be substituted.

Timer block 124 provides a measurement of the time interval between the end of the first user-spoken utterance and the start of the second user-spoken utterance, as well as a measurement of the reconnect time interval after a predefined TERMINATE command has been recognized. These time intervals may be initialized, read, and reset by controller 120 via data bus 126. Refer to the detailed description in FIG. 2 for the operation of these timers.

Speakerphone 150 performs the transmit/receive audio switching function, as well as the received/reply audio multiplexing function of the hands-free control system. User-spoken input speech is applied to microphone 152, which is typically remotely-mounted at a distance from the user's mouth (e.g., on the automobile sun visor). The microphone 152 generates an electrical input speech signal, which is then amplified by preamplifier 153, to provide input speech signal 154 to speakerphone 150. Speakerphone 150 directs the input speech signal at 154 to speech recognizer 110 via input signal line 158.

In a simplex system, when the mobile radio user is talking, signal detector 160 provides a positive control signal via detector output 162 to close transmit audio switch 156, and a negative control signal via detector output 164 to open receive audio switch 166. Conversely, when the landline party is talking, signal detector 160 provides the opposite plurality signals to close receive audio switch 166, while opening transmit audio switch 156. When the receive audio switch 166 is closed, receiver audio 146 from speech communications device 140 is routed through receive audio switch 166 to multiplexer 170 via switched receive audio output 168. Multiplexer 170 controls the audio path between voice reply audio 132 from speech synthesizer 130, and switched receive audio 168, in response to multiplex control signal 128 from device controller 120. Whenever the device controller sends information to the speech synthesizer, multiplexer signal 128 directs multiplexer 170 to route the voice reply audio to the speaker. Vehicle speakerphone audio 172 is usually amplified by audio amplifier 174 before being applied to speaker 176.

The vehicle speakerphone embodiment described herein is only one of numerous possible configurations. For example, it may be desired that speech recognizer 110 always be responsive to the mobile user's commands, whether or not the landline party is talking. In such a case, input speech signal 154 would be directly connected to speech recognizer 110. Furthermore, in some communications systems, it may prove advantageous to replace audio switches 156 and 166 with variable gain devices that provide equal but opposite attenuation in response to the control signals from the signal detector. Signal detector 160 may also supply a signal to device controller 120 indicating whether the landline party or mobile user is speaking, which can then be used to prevent speech recognizer 110 from improperly recognizing speech from the landline party.

As may now be appreciated, device controller 120 is the heart of the user-interactive hands-free voice command control system 100. An example of a device controller known in the art and suitable for use with the present invention is a microprocessor. The detailed operation of device controller 120 will now be described in terms of a software flowchart for control system 100.

Figure 2A:
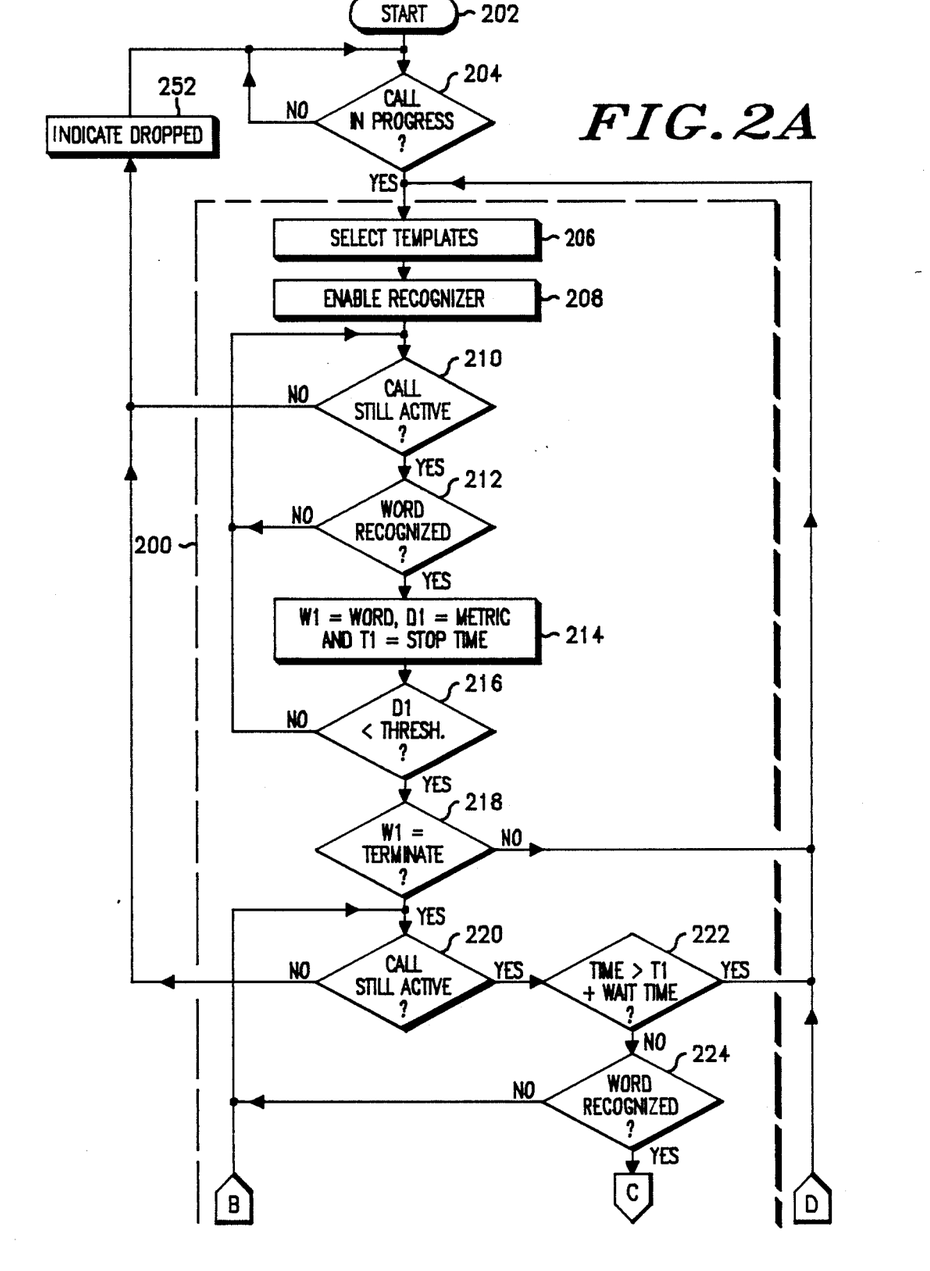
FIGS. 2A and 2B are a flowchart illustration sequence of operations performed by the control system in accordance with the practice of the preferred embodiment of the present invention.
Figure 2B:
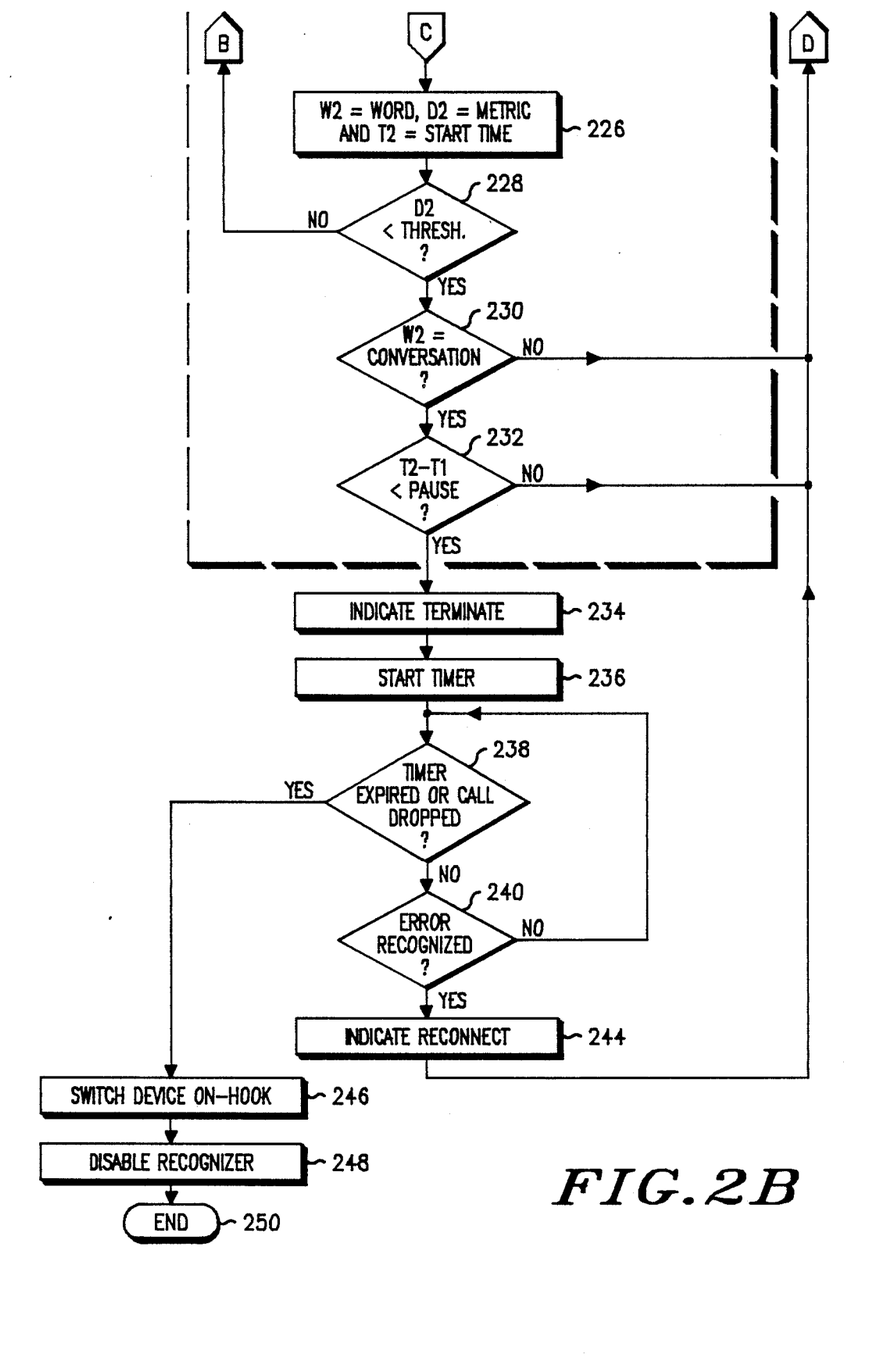

FIG. 2a and 2b describe the sequence of steps performed by control system 100 during a call terminating command sequence. Beginning with step 202, the controller first checks the status of communications device 140 in step 204. If a call is not in progress, control returns to step 204 such that the call terminating command sequence will not be performed. If a call is in progress, control proceeds to sequence 200, which represents the speech recognition process for the two words TERMINATE CONVERSATION.

Appropriate word recognition templates are first selected in step 206. Next, speech recognizer 110 is enabled to recognize user-spoken utterances in step 208. In step 210, the controller checks to see that the telephone call is still active, such that a dropped call will immediately be indicated to the user in step 252. This indication may be the synthesis of words such as CALL DROPPED, or other audible or visual indication.

If the call is still active, the controller tests whether the speech recognizer has recognized any word in step 212. If no word has yet been recognized, control returns to step 210 to again check to see that the call is still active. However, if a word has been recognized, step 214 assigns the variables W1, D1, and T1 to different parameters of the recognized word. More specifically, the variable W1 is assigned to the word that was recognized. The distance metric, or quantitative measurement of the match of the recognized word to the particular word template, is designated as the variable D1. The variable T1 is assigned to the time instant associated with the end of the first utterance corresponding to word one, defined as the stop time.

In step 216, the distance metric D1 for word one is compared to a speech recognition threshold to determine whether or not it meets a predetermined degree of similarity. All speech recognition algorithms inherently have some quantitative recognition threshold which must be met before it is determined that the utterance matches to the template. If desired, this speech recognition threshold may be adjusted to correspond to a higher degree of similarity for call terminating commands, due to the importance of minimizing falsing. If D1 is not less than the distance metric threshold, then control returns to step 210. If D1 is less than the distance metric threshold, then step 218 tests whether or not the word recognized corresponds to the correct word recognition template corresponding to the predefined call terminating command. In the preferred embodiment, step 218 simply tests whether or not W1 is the word TERMINATE. If the word TERMINATE was not recognized, control returns to the beginning of sequence 200.

If the first word recognized was TERMINATE, then the call is again checked in step 220 to see if it is still active. Again, if it is not still active, a CALL DROPPED indication is output at block 252, and control returns to the beginning steps. If the call is still active, step 222 checks to see how much time has passed since the end of the word TERMINATE. If this time exceeds the maximum wait time, control returns to sequence 200. Step 222 ensures that the controller does not wait indefinitely for the second utterance to be recognized. If the wait time has not been exceeded, step 224 checks to see if a second word has been recognized. If not, control returns to step 220. If a second word has been recognized, the variables W2, D2, and T2 are assigned in step 226 as follows: W2 is assigned to the word that was recognized, D2 is assigned to the distance metric of the second word that was recognized, and T2 is assigned to the particular instant of time at the start of the second user-spoken utterance. Step 228 again checks the distance metric D2 against the speech recognition threshold to see if a proper template match has been achieved. If not, control returns to step 220. If D2 is less than the required matching threshold, then the second word variable W2 is tested in step 230 to see if the proper second word of the call terminating command has been recognized. In the preferred embodiment, the second word CONVERSATION is used. If W2 is not CONVERSATION, control is again directed to sequence 200.

Next, in step 232, the time interval between the end of the first user-spoken utterance and the start of the second user-spoken utterance, or T2−T1, is compared to a predefined maximum pause time interval. This ensures that the two words TERMINATE and CONVERSATION were uttered with less than the specified pause interval between them. Any appropriate predetermined pause time interval, preferably less than one second, may be chosen. In the preferred embodiment, the maximum pause time interval used is 300 milliseconds. If T2−T1 is not less than the pause time interval, then control again returns to sequence 200. However, if TERMINATE CONVERSATION has been recognized in the proper sequence with less than the predetermined pause time interval between the words, control proceeds to step 234 where the controller indicates to the user that TERMINATE CONVERSATION has been recognized. Again, this indication may be performed by speech synthesis, visual, or audio means.

In step 236, the reconnect timer is started. The reconnect timer measures the time interval after the occurrence of the recognition of TERMINATE CONVERSATION. At this time, it may be desirable to mute the received audio to prevent interference with recognition of the error command. In step 238, the reconnect timer is checked to see if it has exceeded a predetermined maximum reconnect time interval, or if the call has been dropped. In the preferred embodiment, such a maximum reconnect time interval would be in the range of 2 to 10 seconds, preferably 5 seconds. If the reconnect timer has not yet expired and the call is still active, control proceeds to step 240, where the speech recognizer is programmed to recognize a user-spoken utterance corresponding to a predefined error command. The word CALL is used in the present embodiment as such an error command. If the error command is recognized before the reconnect timer has expired, then the controller indicates that the call will be reconnected in step 244. For example, the controller could synthesize a BEEP to indicate that the call is again active, and unmute the received audio to allow the conversation to continue. Control would then return to sequence 200 to look for the words TERMINATE CONVERSATION. If the error command is not recognized before the reconnect timer expires, then the device controller assumes that the user desires the controller to disconnect the telephone call. Accordingly, in step 246, the controller switches the speech communications device to an on-hook state. In step 248, the speech recognizer is disabled, and the call terminating process ends at step 250.

In summary, it can now be seen that the present invention provides a reliable method for terminating a telephone call by a specific sequence of steps performed by the controller. The present invention requires that several constraints are placed upon the recognition of the call terminating command recognition sequence. As described above, the constraints imposed upon the call terminating procedure are as follows (using the words TERMINATE and CONVERSATION as examples): (1) the predefined call drop command must be recognized as two separate speech utterances (e.g., TERMINATE and CONVERSATION); (2) in proper sequence (e.g., TERMINATE first, then CONVERSATION); (3) with a maximum pause time interval between the end of the first utterance and the start of the second utterance (e.g., 300 milliseconds); and (4) which meet predefined speech recognition matching criteria. Furthermore, a confirmation time interval is provided such that the user may reconnect the call through the use of an error command.

Accordingly, the present invention provides high reliability for hands-free control systems, even when used in environments having a high level of ambient background noise. For example, the present invention may be used in any situation where the user wishes to answer a call and terminate a call by voice command. Typically, the invention would be used in conjunction with a speakerphone providing hands-free capability to either landline or mobile telephones. However, the present invention is also well suited for use with handset or headset-type phones.

While specific embodiments of the present invention have been shown and described herein, further modifications and improvements may be made by those skilled in the art. In particular, it should be noted that the command words TERMINATE, CONVERSATION, and CALL were chosen in the preferred embodiment only as representative English words which meet the aforementioned criteria. However, other command words may be chosen if desired, especially for use with different languages. All such modifications which retain the basic underlying principles disclosed and claimed herein are within the scope of this invention.

What is claimed is:

1. A speech communications device having a voice command system for controlling a voice communication path established by said speech communications device, said voice communication path being controlled by a command signal provided by said control system in response to user-spoken command words, said control system comprising:
    speech recognition means for recognizing sequential first and second user-spoken utterances at least during the time said voice communication path is established, said speech recognition means including;
    first means for recognizing, during the time said voice communication path is established, said first user-spoken utterance as one corresponding to a first predetermined command word, and for producing a first detect signal in response to such recognition,
    second means for recognizing said second user-spoken utterance as one corresponding to a second predetermined command word, for producing a second detect signal if said second predetermined command word is recognized, and for cancelling said recognition of said first predetermined command word if said second predetermined command word is not recognized; and
    decision means for providing said command signal in response to said second detect signal occurring within a predetermined recognition time interval after said first detect signal.

2. The speech communications device according to claim 1, further comprising:
    third means for recognizing a third user-spoken utterance as one corresponding to third predetermined command word, and for producing a third detect signal in response to such recognition; and
    correction means for preventing said decision means from providing said command signal if said third detect signal occurs within a predetermined verification time interval after said second detect signal.

3. The speech communications device according to claim 1, wherein said predetermined recognition time interval is less than 5 seconds.

4. The speech communications device according to claim 2, wherein said predetermined verification time interval is less than 10 seconds.

5. A speech communications device having a hands-free user-interaction voice command control system including means for switching said communications device from an off-hook mode, wherein a communications path is established, to on-hook mode, wherein said communications path is terminated, in response to an on-hook signal, said control system comprising:
    first means for recognizing, in said off-hook mode, a first user-spoken utterance as one corresponding to a first predetermined terminate command word, and for producing a first detect signal in response to such recognition;
    timer means for measuring a pause time interval between the end of said first user-spoken utterance and the start of a sequential second user-spoken utterance, and for providing a timer signal only if said measured pause time interval is less than a predetermined maximum pause time interval;
    second means for recognizing said second user-spoken utterance as one corresponding to a second predetermined terminate command word, for producing a second detect signal if said second predetermined terminate command word is recognized, and for cancelling said first detect signal if said second predetermined terminate command word is not recognized; and
    decision means for providing a disconnect signal only in response to said timer signal and the sequential occurrence of said first and second detect signals, such that the recognition of said second terminate command word does not cause termination of said communications path if said measured pause time interval exceeds said predetermined maximum pause time interval.

6. The speech communications device according to claim 5, further comprising:
    means for providing an indication to a user in response to said disconnect signal;
    third means for recognizing a user-spoken utterance as one corresponding to a predetermined error command word, and for producing an error signal in response to such recognition; and
    correction means for providing said on-hook signal in response to said disconnect signal only if said error signal does not occur within a predetermined reconnect time interval after the occurrence of said disconnect signal, such that the recognition of said error command word within said predetermined reconnect time interval prevents the recognition of said terminate command words from causing termination of said communications path.

7. The speech communications device according to claim 5, wherein said speech communications device is a mobile radiotelephone.

8. The speech communications device according to claim 5, wherein said speech communications device includes a speakerphone.

9. The speech communication device according to claim 6, wherein said first, second, and third recognizing means implement connected-word speech recognition.

10. The speech communications device according to claim 5, wherein said first and second predetermined terminate command words each have at least two syllables.

11. The speech communications device according to claim 5, wherein said predetermined maximum pause time interval is less than 1 second.

12. The speech communications device according to claim 6, wherein said indication providing means is a speech synthesizer.

13. The speech communications device according to claim 6, wherein said predetermined reconnect time interval is less than 10 seconds.

14. A method of controlling a speech communications device having speech recognition and device operational control capabilities for controlling a voice communication path established between said speech communications device and another device, said method comprising the steps of:
establishing said voice communication path;
recognizing, at least during the time said voice communication path is established, a first user-spoken utterance as one corresponding to a first predetermined command word, and producing a first detect signal in response to such recognition;
measuring a pause time interval between the end of said first user-spoken utterance and the start of a sequential second user-spoken utterance, and providing a timer signal only if said measured pause time interval is less than a predetermined maximum pause time interval;
recognizing said sequential second user-spoken utterance as one corresponding to a second predetermined command word, producing a second detect signal if said second predetermined command word is recognized, and returning to said recognizing a first user-spoken utterance step if said second predetermined command word is not recognized; and
providing a first device control signal only in response to said timer signal and the sequential occurrence of said first and second detect signals.

15. The method according to claim 14, further comprising the steps of:
providing an indication to a user in response to said first device control signal;
recognizing a third user-spoken utterance as one corresponding to a third predetermined command word, and producing an error signal in response to such recognition; and
producing a second device control signal in response to said first device control signal only if said error signal does not occur within a predetermined reconnect time interval after the occurrence of said first device control signal.

16. The method according to claim 14, wherein said speech communications device is a mobile radiotelephone.

17. The method according to claim 14, wherein said speech communications device includes a speakerphone.

18. The method according to claim 14, wherein all recognizing steps are performed using connected-word speech recognition.

19. The method according to claim 14, wherein said first and second predetermined command words each have at least two syllables.

20. The method according to claim 14, wherein said predetermined maximum pause time interval is less than 1 second.

21. The method according to claim 15, wherein said indication providing step is performed using speech synthesis.

22. The method according to claim 15, wherein said predetermined reconnect time interval is less than 10 seconds.

23. The speech communication device according to claim 1, wherein said first and second predetermined command words each have separate and distinct speech recognition templates.

24. The speech communication device according to claim 1, wherein said speech recognition means is only responsive to said second predetermined command word spoken during said predetermined recognition time interval.

25. The speech communication device according to claim 1, wherein said command signal functions to interrupt said voice communication path.

26. The speech communication device according to claim 5, wherein said first and second predetermined terminate command words each have separate and distinct speech recognition templates.

27. The speech communication device according to claim 5, wherein said first and second recognizing means recognize user-spoken utterances at least when said communications path is established.

28. The speech communication device according to claim 5, wherein said disconnect signal is provided only when said first and second predetermined terminate command words are spoken during the time said communication path is established.

29. The speech communication device according to claim 5, further comprising means for providing said on-hook signal in response to said disconnect signal.

30. The method according to claim 14, wherein said first and second predetermined command words each have separate and distinct speech recognition templates.

31. The method according to claim 14, wherein said first device control signal is provided only when said first and second predetermined command words are spoken during the time said voice communication path is established.

32. The method according to claim 14, further comprising the step of interrupting said voice communication path in response to said first device control signal.

33. The method according to claim 15, wherein said second device control signal functions to interrupt said voice communication path.

34. A voice command control system for controlling a speech communications device having a voice communication path established for the user, said voice communication path being controlled by a command signal provided by said control system in response to user-spoken command words, said control system comprising:

first means for recognizing, during the time said voice communication path is established, a first user-spoken utterance as one corresponding to a first predetermined command word, and for producing a first detect signal in response to such recognition;

second means to recognizing a sequential second user-spoken utterance as one corresponding to a second predetermined command word, for producing a second detect signal if said second predetermined command word is recognized, and for cancelling the effect of said first predetermined command word recognition if said second predetermined command word is not recognized;

decision means for providing said command signal in response to the occurrence of both said first and second detect signals;

third means for recognizing a user-spoken utterance as one corresponding to a third predetermined command word, and for producing a third detect signal in response to such recognition; and correction means for preventing said decision means from providing said command signal if said third detect signal occurs within a predetermined verification time interval after said second detect signal.

35. The voice command control system according to claim 34, wherein said first and second predetermined command words each have separate and distinct speech recognition templates.

36. The voice command control system according to claim 37, wherein said command signal is provided only when said second predetermined command word is spoken during said predetermined recognition time interval.

37. The voice command control system according to claim 34, wherein said decision means provides said command signal only in response to said second detect signal occurring within a predetermined recognition time interval after said first detect signal.

38. The voice command control system according to claim 37, wherein said command signal is provided only when said first and second predetermined command words are spoken during the time said voice communication path is established.

39. The voice command control system according to claim 34, wherein said command signal functions to interrupt said voice communication path.

40. A method of controlling an electronic device having speech recognition and device operational control capabilities for terminating a voice communication path established between said electronic device and another device, said method comprising the steps of:

recognizing, at least during the time said voice communication path is established, a first user-spoken utterance as one corresponding to a first predetermined command word, and producing a first detect signal in response to such recognition;

recognizing a subsequently-spoken utterance as one corresponding to a second predetermined command word, producing a second detect signal if said second predetermined command word is recognized, and cancelling said recognition of said first user-spoken utterance if said second predetermined command word is not recognized;

providing a first device control signal in response to the sequential occurrence of said first and second detect signals;

providing an indication to a user in response to said first device control signal;

recognizing a user-spoken utterance as one corresponding to a third predetermined command word, and producing an error signal in response to such recognition; and terminating said voice communication path in response to said first device control signal only if said error signal does not occur within a predetermined reconnect time interval after the occurrence of said first device control signal.

41. The method according to claim 40, wherein said first and second predetermined command words are each recognized using separate and distinct speech recognition templates.

42. The method according to claim 40, further comprising the step of measuring a pause time interval between the end of said first user-spoken utterance and the start of said subsequently-spoken utterance, and providing said first device control signal only if said measured pause time interval does not exceed a predetermined maximum pause time interval.

43. The method according to claim 42, wherein only said second predetermined command word can be recognized during said maximum pause time interval.

* * * * *